United States Patent Office 3,567,369
Patented Mar. 2, 1971

3,567,369
ION EXCHANGE PROCESS FOR RECOVERING BORATES FROM BRINE
Elie M. Chemtob, Claremont, Calif., assignor to Stauffer Chemical Company, New York, N.Y.
No Drawing. Filed Jan. 12, 1968, Ser. No. 697,539
Int. Cl. C01b 25/00
U.S. Cl. 23—59   12 Claims

ABSTRACT OF THE DISCLOSURE

A process for recovering borates from borate-containing brines by contacting a boron-specific resin—for example, an insoluble cross-linked copolymer of a mixture of 85% to 99.5%, on a molar basis, of styrene and 0.5% to 15%, on a molar basis of divinylbenzene, the copolymer having attached to the aromatic nuclei thereof groups of the structure —$CH_2N(CH_3)C_6H_8(OH)_5$ in which the —$C_6H_8(OH)_5$ portion is the sorbityl radical, with a borate-containing brine to load the resin with borates and then eluting the loaded resin with water to remove the borates.

---

This invention relates to the recovery of borates from boron-containing brines. More specifically, this invention pertains to a process for the recovery of borates from a boron-containing brine by contacting the brine with a boron specific resin to load the resin with borates and then eluting the loaded resin with water to remove the borates.

The recovery of boron values from boron-containing brines, by contacting such brines with boron specific resin is generally known. U.S. Patent 2,813,838, disclosed a process whereby a boron specific resin is contacted with a suitable boron-containing brine and then eluted with a dilute mineral acid, such as sulfuric acid, to recover the boron values from the resin in the form of boric acid. Such a process is taught to be useful to exhaust boron from a brine or boron-contaminated waters. The step of stripping the boron-loaded resin with a dilute mineral acid is carried out in order to regenerate the resin for another brine-exhausting operation. Usually, even though the acid treatment step does strip all of the boron from the loaded resin, the eluted solution is so contaminated with the original brine that the boron separation from this solution is rather tedious. In such prior art processes there is also a large loss of acid due to its absorption by the resin or reaction with brine constituents. A caustic wash of the eluted resin is required before the resin can be reused to remove more boron from brine. Consequently, boron recovery by this process is totally uneconomical.

The process of the present invention overcomes and eliminates the deficiencies inherent in prior art processes and is an economically attractive and efficient process for the recovery of borates from boron-containing brines.

In the process of the present invention certain insoluble boron-specific ion exchange resins are contacted with a suitable boron-containing brine to load the resin with borates, and then the loaded resin is eluted with water to first remove an appreciable percentage of the entrained brine, and then to remove the absorbed borates from the resin, thereby sufficiently regenerating the resin for reuse. This invention is predicated on the discovery that borates can be successfully removed from certain boron-specific resins already loaded with boron by elution with water in a highly efficient manner whereas elution of the same resins with mineral acids is highly uneconomical. The recovery of appreciable percentages of borates from boron-specific resins by eluting with water is surprising and unexpected.

The resins of this invention which have a specificity for boron compounds are the products obtained by reacting polyhydroxyalkyl amines with a haloalkylated, cross-linked, insoluble copolymer of a monovinyl aromatic hydrocarbon and a compound which is copolymerizable with said monovinyl hydrocarbon and which contains at least two non-conjugated groups of the structure $CH_2\!=\!C\!=\!$. The amines which are reacted are those which have the structure $$R-\underset{\underset{R_1}{|}}{N}-Z$$

wherein Z is a pentahydroxyhexyl group, —$C_6H_8(OH)_5$, or a tetrahydroxypentyl group, $C_5H_6(OH)_4$, from the class consisting of the sorbityl, mannityl, galactityl (dulcityl), talityl, arabityl and ribityl groups, R is a member selected from the group consisting of hydrogen and a monovalent organic compound, preferably a hydrocarbon group, and $R_1$ is hydrogen and when R and $R_1$ are taken together they are a $$Z-N{\overset{\displaystyle CH_2-CH_2-}{\underset{\displaystyle CH_2-CH_2-}{\diagup}}}$$

group in which Z is defined as before.

Preferably, said copolymer has attached to the aromatic nuclei thereof groups selected from the class consisting of the structures $$-C_nH_{2n}-N(R)-Z$$

and $$-C_nH_{2n}-\overset{\oplus}{\underset{Z}{N}}{\overset{\overset{\displaystyle \ominus}{X}\quad CH_2-CH_2}{\diagup}\atop\diagdown}N-Z\atop CH_2-CH_2$$

in which $n$ is an integer of value 1 to 4, R represents a monovalent hydrocarbon group, and Z represents a radical from the class consisting of the sorbityl, mannityl, galactityl, talityl, arabityl, and ribityl radicals and X is selected from the group consisting of chlorine or bromine. More preferably, the groups are of the structure $$-C_nH_{2n}-N(R)-Z$$

in which $n$, R and Z are as defined. Even more preferably, the groups are of the structure $$-CH_2N(R)-Z$$

in which R and Z are as defined. Most preferably, the groups are of the structure $$-CH_2N(CH_3)-C_6H_8(OH)_5$$

in which the —$C_6H_8(OH)_5$ portion is the sorbityl radical.

These amines are either available commercially or can be made by reacting under reducing conditions an amine $$R\text{NH}\atop\underset{}{|}\atop R_1$$

with the following hexoses or pentoses: gulcose, fulose, mannose, galactose, talose, altrose, arabinose and ribose. Because of its availability and ease of reaction, glucose is the carbohydrate of first choice; and it gives rise to amines, $$R-\underset{\underset{R_1}{|}}{N}-Z$$

in which the Z group is the sorbityl radical.

The R group present in the intermediate, $$R\text{NH}\atop\underset{}{|}\atop R_1$$

and also in the amine, $$R-\underset{\underset{R_1}{|}}{N}-Z$$

can be hydrogen or an aliphatic or aromatic group. This group is typified by the following: hydrogen, methyl, ethyl, n-propyl, isopropyl, n-butyl, sec-butyl, tert-butyl, hexyl, lauryl, cotadecyl, cyclohexyl, phenyl, benzyl, and naphthyl groups as well as the homologues and isomers of those listed. The group R of the amine,

remains intact during the preparation of the amine,

and during the formation of the final resinous product. The group Z likewise remains intact throughout. In reality, however, it is much preferred that the group which is represented by R above be a lower alkyl group; and the methyl group is most preferred. One reason for this preference is that the capacity of the final resin on a weight basis, for adsorbing boron compounds is on a weight basis, for adsorbing boron compounds is inversely proportional to the size of the group which is represented by R. That is to say, the larger the group which is represented by R, the lower is the capacity of the final resin per unit of weight.

From the standpoints of economy, ease of preparation and the properties of the resinous adsorbent, it is much preferred to employ N-methylglucamine, otherwise known as methylsorbitylamine,

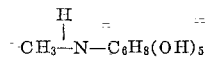

which is made by catalytically hydrogenating glucose in the presence of methylamine.

The amine of the formula

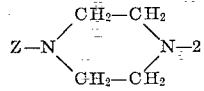

can be prepared using catalytic hydrogenation by known procedures.

The products of this invention are made by a series of steps, the first of which comprises preparing an insoluble copolymer of an aromatic vinyl hydrocarbon, preferably styrene, and a polyvinyl, copolymerizable, cross-linking agent, preferably divinylbenzene. The following steps comprise haloalkylating, preferably chloromethylating, the copolymer, and thereafter reacting the amine,

with the haloalkylated copolymer. This procedure, aside from the use of the particular kind of amine is essentially like the process described in U.S. Patent No. 2,591,574 to which reference is made.

Thus, an insoluble, cross-linked copolymer of a monovinyl hydrocarbon and a cross-linking agent containing two or more non-conjugated vinylidene groups,

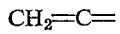

is first prepared. Suitable monovinyl compounds include styrene, which is much preferred, vinyltoluene, vinylnaphthalene, ortho-, meta-, and para-ethyl styrenes, vinylanthracene, and homologues and isomers of the above. Suitable copolymerizable, cross-linking agents include divinylbenzene, which is much preferred, divinyltoluenes, divinylnaphthalenes, divinylethylbenzenes, divinylxylenes, trivinylbenzenes, diallyl esters such as diallyl phthalate and doubly unsaturated esters such as ethylene glycol diacrylate and dimethacrylate. What is required is that the cross-linking agent be copolymerizable with the monovinyl compound and that it contain a plurality of $CH_2=C=$ groups. As little as 0.5% on a molar basis, of the cross-linking agent and as much as equal parts of the monovinyl compound and the cross-linking agent, on the same basis, can be used; but it is preferred that the cross-linker constitute from 0.5% to 15% of the copolymerizable mixture on a molar basis. Obviously mixtures of two or more monovinyl compounds and two or more cross-linking agents can be copolymerized if necessary or desirable.

The insoluble, cross-linked copolymers can be prepared by polymerizing the monomeric mixtures in bulk, in a solvent, in emulsion, or in suspension. Suspension polymerization, wherein a copolymerizable mixture is suspended by agitation in a medium such as water which is not a solvent for the monomers and is therein polymerized, is much preferred because it gives rise to products which are in the form of small discrete beads or spheroids. Since the copolymerization reaction is accelerated by heat and catalysts of the free-radical type, it is advisable to employ any convenient temperature above 50° C.—preferably a temperature from 50° to 90° C. in the case of suspension polymerization—and to use a catalyst. Suitable catalysts include dimethyl azobisisobutyrate, α,α'-bisazoisobutyronitrile, benzoyl peroxide, acetyl peroxide, lauroyl peroxides, tert-butyl hydroperoxide, di-tert-butyl peroxide, stearoyl peroxides, and "per-salts" such as ammonium perborate and ammonium persulfate. The catalysts are used in amounts from 0.2% to 5%—and preferably from 0.5% to 2%—based on the weight of the polymerizable compounds.

In the next step, the insoluble, cross-linked copolymer is haloalkylated. Actually it is preferred, for the sake of ease and economy, that the copolymer be chloromethylated, whereby chloromethyl groups, —CH$_2$Cl, become attached to the hydrocarbon units in the copolymer. The copolymer can be reacted, for example, with a mixture of an aldehyde and hydrochloric acid or a mixture of a dihalide and a Friedel-Crafts catalyst. Methods of chloroalkylating which may be used for introducing the

group and which also serve as guides for introducing —C$_2$H$_4$X, —C$_3$H$_6$X, —C$_4$H$_8$X groups, wherein X represents an atom selected from the group consisting of chlorine and bromine, are described in "Organic Reactions," vol. 1, Chapter 3, page 63 et seq. (John Wiley & Sons, Inc., New York City, 1942). Since the capacity of the final resin is proportional to the number of Z groups which it contains and since the number of such groups cannot be more than the number of haloalkyl groups which are first introduced, it is most desirable that the haloalklation reaction be carried as far as is conveniently possible. The extent of the haloalkylation reaction can be determined by a hologen analysis. Very valuable resins are those made by aminating, with N-methyl-glucamine, copolymers which contain from two or six haloalkyl groups for every four aromatic nuclei in the cross-linked copolymer.

The next step in the formation of the product of this invention is the reaction of the amine,

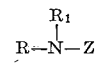

with the haloalkylated copolymer. This reaction is preferably carried out in a liquid which is a solvent for the amine and which also swells the particles of the haloalkylated copolymer. Dimethylformamide is a very satisfactory solvent for this purpose. Reaction takes place fairly readily at temperatures above 50° C.; and temperatures up to the boiling point of the reaction mixture can be used. The reaction is facilitated if the particles of haloalkylated resin are first swollen by immersion in an organic liquid such as benzene, toluene, or ethylene dichloride or dimethylformamide.

The resin may be loaded with borates to almost maximum capacity as seen in Example I. The efficiency of the loading step decreases, however, as the maximum resin capacity is approached; the resin absorbs an increasingly smaller percentage of boron from the flow of the brine. Thus in a preferred embodiment of the process of this invention, a boron-specific resin is contacted with a boron-containing brine to load the resin to the level of between about 30% and 100% of total capacity, and preferably between about 50% and about 90% of the total capacity for boron of the resin. The capacity of a resin can be easily determined by treating a known weight of dried resin with a large excess of boron-containing brine. The mixture of resin plus a brine is thoroughly mixed for one to two hours until a sample of the brine shows no variation in its boron content. The capacity of the resin is calculated from the difference of boron in the original brine and the residual solution.

Next, the loaded resin is then contacted with water to remote borates. The resin can be almost completely eluted of its borate content as seen in Example V. The efficiency of the eluting step decreases however, as total elution is approached since the eluting water washes an increasingly smaller percentage of borates from the resin as total elution is approached. Preferably, the loaded resin is contacted with water to remove borates until between about 25% and about 75% of the total capacity of the resin for boron has been removed.

A more specific description of the process of this invention will be discussed in two steps: the loading step and then the eluting step.

LOADING STEP

In carrying out the loading step in which a boron-specific resin is contacted with a suitable boron-containing brine, the temperature of the brine is not critical however favorable results are obtained at room temperature and more favorable results are obtained at temperatures in the neighborhood of 85° C. A preferred temperature range of loading is between about 0° C. and about 90° C.

The most preferred pH of the brine for the loading step is the pH of the natural brine, which is about pH 9. However, suitable loading is achieved, at any pH preferably within the range between about 3 and about 12.

The rate at which the brine is contacted with the boron-specific resins effects the efficiency of the loading step. Using, for instance, 500 ml. of resin, at 50 ml. per minute in a one inch diameter column, the volume of brine required to saturate the resin is slightly larger than that required at 10 ml. per minute, but almost ⅘ of the time of loading is saved. At 80 ml. per minute the volume required becomes considerably larger than at 10 or 50 ml. per minute, and a series of columns would be required to take advantage of the increased flow rate. The preferred rate of brine flow is about ⅒ of the volume of the resin per minute.

ELUTION STEP

In the recovery of borates from the boron-specific resins, the nature of the elutant water as hereinabove discussed is a critical factor. The temperature of the elutant and the method of contacting the elutant with the resins are also important factors. Either co-current or counter-current contacting of a stream of water with the already loaded boron-specific resin is suitable for extracting the borates from the resin into the water. The preferred method of recovering the boron values is by passing water through a column packed with the loaded boron-specific resin, rather than batch stirring the water with the loaded resin which is not suitable for recovering any appreciable amount of boroates from the resins. As previously indicated herein, the nature of the elutant, water, is a critical factor in the operation of the process of the present invention. For instance, it has been found that the elution of the boron-specific resins of this invention with sulfuric acid is unsuitable because of high acid absorption by the resins. Such absorption causes a great loss of acid and leads to difficulty in separating the boron from the acid solution. Comparative examples of elution with sulfuric acid and water are given in the examples.

The temperature of the water during the elution step is not critical. However, the water temperature effects the efficiency of the elution. It has been found that as the temperature of the water is increased, the efficiency also increases. The effect of temperature on efficiency is illustrated in Examples IV and V. A preferred range of temperatures of the water during the elution step is between about 60° C. and 95° C.

A boron-specific resin obtainable by reacting N-methylglucamine with a chloromethylated, insoluble, crossed, insoluble copolymer of styrene and divinylbenzene and preparable according to the procedures described heretofore, and hereinafter termed "boron-specific resin" was used in the following specific examples.

Example I 200 ml. of the boron-specific resin were placed in a 1 inch diameter column. Brine at 25° C. was passed through the column at 10 ml. per minute. The results are summarized in Table 1.

TABLE 1.—BORON RECOVERY FROM WASTE BRINE WITH BORON SPECIFIC RESIN

The column was loaded with boron from a waste solution of Searles Lake Brine, t=25° C.; resin volume in column=200 ml.; density of brine=1.220 at 25° C.; flow rate=10 ml./min.

| | | Effluent liquid, ml. | | Effluent Cl conc., wt. percent | Equiv. vol. of original brine in effluent, ml. | Effluent $H_3BO_3$ percent of— | | | Resin loading | |
|---|---|---|---|---|---|---|---|---|---|---|
| | Time, min. | Total | Sample | | | Conc., wt. percent | Orig. removed | Cum. total recovery | Incremental percent of sat. | Cum. percent of total sat. |
| Sample No.: | | | | | | | | | | |
| Original | Brine | | | 12.6 | | 0.74 | | | | |
| 0 | 0 | 0 | 0 | 0 | 0 | 0 | 0 | 0 | 0 | 0 |
| 1 | 4 | 40 | 40 | 0 | 0 | 0 | | | | |
| 2 | 8 | 80 | 40 | 0 | 0 | 0 | | | | |
| 3 | 12 | 120 | 40 | 0 | 0 | 0 | | | | |
| 4 | 16 | 160 | 40 | 0.28 | 0.88 | 0 | 100 | 100 | 0.10 | 0.10 |
| 5 | 20 | 200 | 40 | 3.13 | 10.6 | 0 | 100 | 100 | 1.30 | 1.40 |
| 6 | 24 | 240 | 40 | 3.73 | 11.5 | 0 | 100 | 100 | 1.54 | 2.94 |
| 7 | 28 | 280 | 40 | 4.73 | 14.6 | 0 | 100 | 100 | 1.98 | 4.92 |
| 8 | 32 | 320 | 40 | 7.15 | 22.0 | 0 | 100 | 100 | 3.00 | 7.92 |
| 9 | 36 | 360 | 40 | 9.38 | 29.0 | 0 | 100 | 100 | 4.02 | 11.94 |
| 10 | 40 | 400 | 40 | 11.10 | 34.2 | 0 | 100 | 100 | 4.6 | 16.54 |
| 11 | 50 | 500 | 100 | 12.32 | 97.5 | 0.12 | 83 | 92.5 | 10.6 | 27.14 |
| 12 | 58 | 580 | 80 | 12.6 | 80 | 0.11 | 86 | 90.0 | 10.1 | 37.24 |
| 13 | 63.3 | 653 | 73 | 12.6 | 73 | 0.17 | 77 | 84.5 | 7.5 | 44.74 |
| 14 | 73.4 | 734 | 81 | 12.6 | 81 | 0.12 | 84 | 84.5 | 8.9 | 53.64 |
| 15 | 83 | 830 | 96 | 12.6 | 96 | 0.10 | 77 | 83.0 | 9.35 | 62.99 |
| 16 | 91 | 910 | 80 | 12.6 | 80 | 0.12 | 84 | 84.0 | 8.8 | 71.79 |
| 17 | 99 | 990 | 80 | 12.6 | 80 | 0.37 | 50 | 79.5 | 4.95 | 76.74 |
| 18 | 110 | 1,100 | 110 | 12.6 | 110 | 0.44 | 40 | 74.5 | 5.85 | 82.59 |
| 19 | 124 | 1,240 | 140 | 12.6 | 140 | 0.51 | 31 | 68.0 | 5.15 | 87.74 |
| 20 | 138 | 1,380 | 140 | 12.6 | 140 | 0.56 | 24 | 62.5 | 3.9 | 91.64 |
| 21 | 208 | 2,080 | 700 | 12.6 | 700 | 0.68 | 8 | 41.0 | 5.15 | 96.79 |
| 22 | 238 | 2,380 | 300 | 12.6 | 300 | 0.72 | | | | |

Example II 25 grams of the boron-specific resin were put in contact with an excess of waste Searles Lake brine containing 0.1275% B, and equivalent to the resin capacity of 8.07 mg. per ml. The pH was adjusted to certain definite values by a careful addition of concentrated hydrochloric acid (or sodium hydroxide for pH 11). For each pH the capacity of the resin was determined by stirring the mixture for two hours and analyzing the residual boron in the brine.

| pH: | Brine wt., gm. | Original boron, mg. | Residual boron | Boron absorbed | Resin capacity |
|---|---|---|---|---|---|
| 3 | 200 | 255 | 65.2 | 189.8 | 7.56 |
| 5 | 200 | 255 | 63.6 | 191.4 | 7.62 |
| 7 | 200 | 255 | 56.8 | 198.4 | 7.92 |
| 9 | 200 | 255 | 50.4 | 204.6 | 8.20 |
| 11 | 200 | 255 | 51.2 | 203.8 | 8.15 |

Example III 36 mls. of the wet boron-specific resin were mixed for 60 minutes by stirring in a beaker with 200 mls. of Searles Lake brine having the following composition (in moles per 1,000 moles $H_2O$): $Na_2Cl_2$ 35.2, $Na_2SO_4$ 8.4, $NaHCO_3$ 1.8, $Na_2B_4O_7$ 0.73, $K_2Cl_2$ 6.15. At the end of this time the resin became loaded with boron to its full capacity. The resin was filtered and given a quick water wash to remove the adhering brine.

The fully loaded resin was then put in a 50 ml. buret and a 10% $H_2SO_4$ solution was poured on top of it at a rate of 0.05 ml. of solution for each ml. of resin per minute. 75 ml. of acid solution were necessary to give an eluate having the same composition in $H_2SO_4$ as the feed solution. The total content of these 75 ml. was found to be 3.9 gr. of $H_2SO_4$. Therefore, 3.6 gr. of $H_2SO_4$ were absorbed by the resin, accounting for about 18 times the weight of boron eluted.

Another 50 gr. of the boron-specific resin were loaded as above. The loaded resin was then stirred for 60 minutes in a beaker with 200 gr. of a 10% $H_2SO_4$ solution. At the end of this time the solution was analyzed and found to contain 5.65% $H_2SO_4$. The absorbed $H_2SO_4$ per gr. of eluted boron is therefore 21.6 gms. In both cases all of the boron loaded on the resin was actually eluted by the sulfuric acid solution. However, large quantities of acid were absorbed.

Example IV 36 ml. of boron-specific resin were placed in a 50 ml. buret ion exchange column. The column was loaded with borates from a Searles Lake brine solution as stated in Example III. Water at 25° C. was used to elute the column at a flow rate of 0.6 ml./min. The results are summarized below:

Total volume eluted—315 ml.
Total boron eluted—122.25 mg.
Percent of resin capacity eluted—59.2%

Example V

The experiment of Example IV was performed with 60 ml. of resin and at a temperature of 85° C. The results are summarized as follows:

Total volume eluted—400 ml.
Total boron eluted—272 mg.
Percent of resin capacity eluted—81.2%

Example VI 500 mls. of wet boron-specific resin was placed in a 1 inch diameter ion exchanger column. Waste Searles Lake brine at 85° C. having the composition of Example III and at the natural pH of 9 was passed through the column at 10 mls./min. for 200 minutes. At the end of this time the resin had absorbed boron to 93.66% of its capacity. The flow of brine was stopped and cold water passed through the column for 35 minutes to rinse the brine from the column, while at the same time eluting a minimum of borates from the resin. Water at 85° C. was passed through the column at a rate of 10 mls./min. for 55 minutes. The volume ratio of eluting water to resin was approximately 1:1. About 50% of the resin capacity was eluted, and the concentration of $H_3BO_3$ in the collected elute was 1.37%. The flow of water was stopped and the column drained to collect the boron-rich solution from the column.

I claim:

1. A process for recovering borates from borate-containing brines which comprises contacting a boron-specific resin with a borate-containing brine to load such resin with borate, and eluting the loaded resin with water to remove borates therefrom by a non-batch stirring procedure, said boron-specific resin is an insoluble cross-linked copolymer of a mixture of an aromatic hydrocarbon having a vinyl group as its sole aliphatic unsaturation and a copolymerizable cross-linking agent which contains at least two groups of the structure $CH_2\!=\!C\!=\!$, said cross-linking agent being present in molar amounts equal to 0.5% to 50% of said aromatic monovinyl hydrocarbon, said copolymer having attached to the aromatic nuclei thereof groups selected from the class consisting of the structures

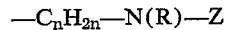

and

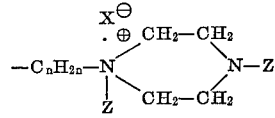

in which $n$ is an integer of value 1 to 4, R represents a monovalent hydrocarbon group, and Z represents a radical from the class consisting of the sorbityl, mannityl, galactityl, talityl, arabityl, and ribityl radicals and X is selected from the group consisting of chlorine or bromine.

2. The process of claim 1 in which said boron specific resin is an insoluble cross-linked copolymer of a mixture of an aromatic hydrocarbon having a vinyl group as its sole aliphatic unsaturation and a copolymerizable cross-linking agent which contains at least two groups of the structure $CH_2\!=\!C\!=\!$, said cross-linking agent being present in molar amounts equal to 0.5% to 50% of said aromatic monovinyl hydrocarbon, said copolymer having attached to the aromatic nuclei thereof groups of the structure

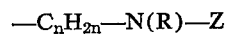

in which $n$ is an integer of value 1 to 4, R represents a monovalent hydrocarbon group, and Z represents a radical from the class consisting of the sorbityl, mannityl, galactityl, talityl, arabityl, and ribityl radicals.

3. The process of claim 1 in which said boron specific resin is an insoluble cross-linked copolymer of a mixture of an aromatic hydrocarbon having a vinyl group as its sole aliphatic unsaturation and a copolymerizable cross-linking agent which contains at least two groups of the structure $CH_2\!=\!C\!=\!$, said cross-linking agent being present in molar amounts equal to 0.5% to 50% of said aromatic monovinyl hydrocarbon, said copolymer having attached to the aromatic nuclei thereof groups of the structure

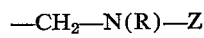

in which R represents a monovalent hydrocarbon group, and Z represents a radical from the class consisting of the sorbityl, manityl, galactityl, talityl, arabityl, and ribityl radicals.

4. The process of claim 1 in which said boron specific resin is an insoluble cross-linked copolymer of a mixture of an aromatic hydrocarbon having a vinyl group as its sole aliphatic unsaturation and a copolymerizable cross-linking agent which contains at least two groups of the structure $CH_2\!=\!C\!=\!$, said cross-linking agent being present in molar amounts equal to 0.5% to 15% of said aromatic monovinyl hydrocarbon, said copolymer having attached to the aromatic nuclei thereof groups of the structure

—CH$_2$—N(CH$_3$)—C$_6$H$_8$(OH)$_5$ in which the —C$_6$H$_8$(OH)$_5$ portion is the sorbityl radical.

5. The process of claim 1 in which said boron specific resin is an insoluble cross-linked copolymer of a mixture of styrene and a copolymerizable cross-linking agent which contains at least two groups of the structure CH$_2$=C=, said cross-linking agent being present in molar amounts equal to 0.5% to 15% of said styrene, said copolymer having attached to the aromatic nuclei thereof groups of the structure —CH$_2$—N(CH$_3$)—C$_6$H$_8$(OH)$_5$ in which the —C$_6$H$_8$(OH)$_5$ portion is the sorbityl radical.

6. The process of claim 1 in which said boron specific resin is an insoluble cross-linked copolymer of a mixture of 85% to 99.5%, on a molar basis, of styrene and 0.5% to 15%, on a molar basis, of divinylbenzene, said copolymer having attached to the aromatic nuclei thereof groups of the structure —CH$_2$N(CH$_3$)C$_6$H$_8$(OH)$_5$ in which the —C$_6$H$_8$(OH)$_5$ portion is the sorbityl radical.

7. The process of claim 1 in which said contacting is done at a rate of flow of between about 0.01 to 0.2 ml. of brine per ml. of resin per minute.

8. The process of claim 1 in which the pH of the said borate containing brine has a pH of about 3 to 12.

9. The process of claim 1 in which the temperature of said water is about 20° C. to about 90° C.

10. The process of claim 1 in which said eluting is done at a flow rate of about 0.005 ml. to 0.05 ml. of water per ml. of resin per minute.

11. The process of claim 1 in which said eluting is done by passing said water in only one direction through a column holding said resin.

12. The process of claim 1 in which said contacting is done until said resin is loaded with said borate-containing brine to at least 95% of its capacity and said eluting is done until at least about 25% of the capacity of said resin is reached.

References Cited

UNITED STATES PATENTS

| 2,591,574 | 4/1952 | McBurney | 260—2.1 |
| 2,738,322 | 3/1956 | Bauman et al. | 210—32 |
| 2,813,838 | 11/1957 | Lyman et al. | 260—2.1E |
| 3,424,563 | 1/1969 | Grinstead | 23—59X |

FOREIGN PATENTS

| 709,550 | 5/1954 | Great Britain | 210—32 |

HERBERT T. CARTER, Primary Examiner

U.S. Cl. X.R.

23—149, 312; 210—32, 38